UNITED STATES PATENT OFFICE.

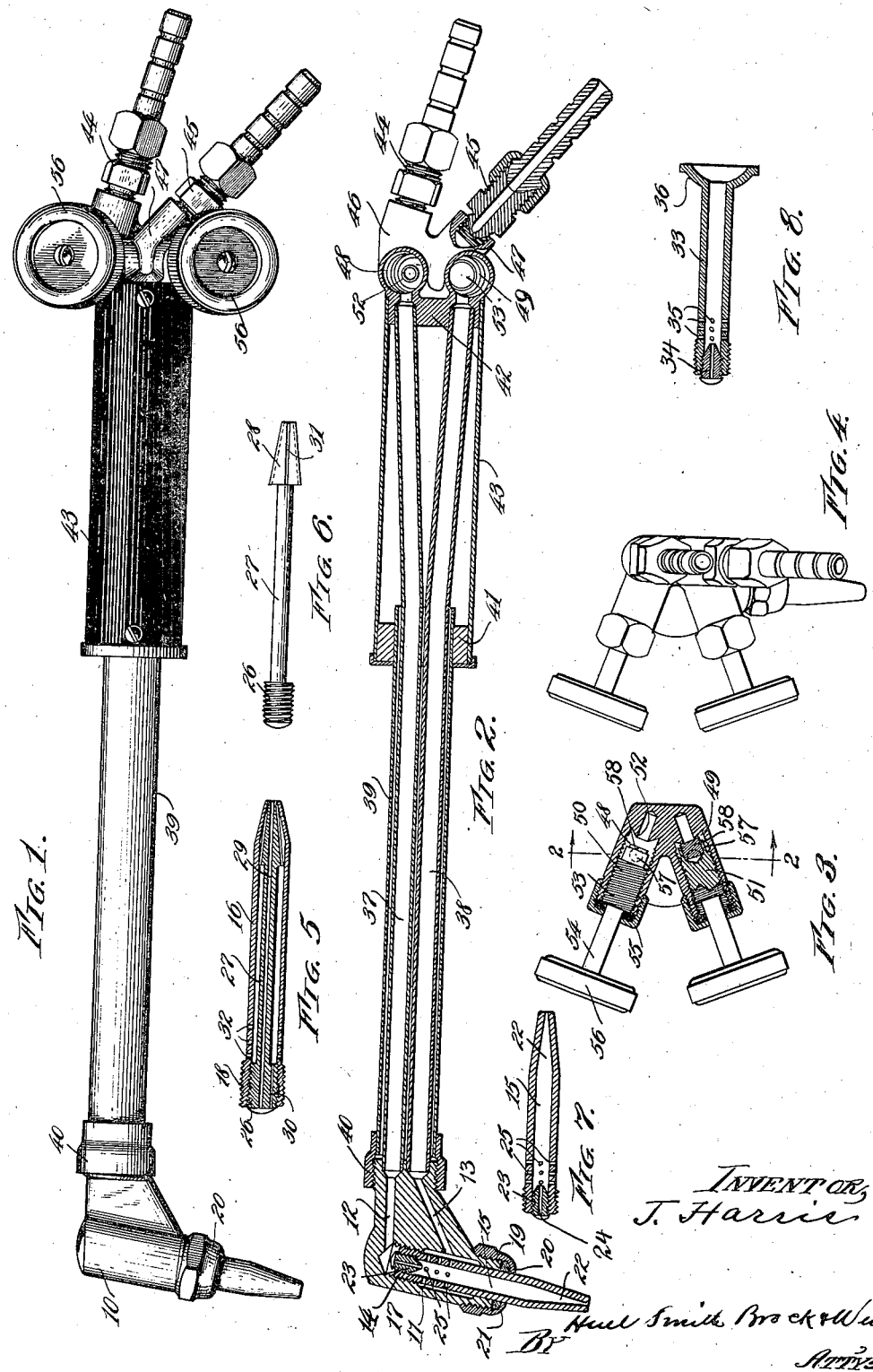
J. HARRIS.
COMBINATION WELDING AND CUTTING BLOWPIPE.
APPLICATION FILED NOV. 17, 1915.
1,276,214. Patented Aug. 20, 1918.

JOHN HARRIS, OF CLEVELAND, OHIO.

COMBINATION WELDING AND CUTTING BLOWPIPE.

1,276,214.   Specification of Letters Patent.   Patented Aug. 20, 1918.

Application filed November 17, 1915. Serial No. 61,887.

*To all whom it may concern:*

Be it known that I, JOHN HARRIS, a citizen of the United States, residing at Cleveland, in the county of Cuyahoga and State of Ohio, have invented a certain new and useful Improvement in Combination Welding and Cutting Blowpipes, of which the following is a full, clear, and exact description, reference being had to the accompanying drawings.

This invention relates generally to blow-pipes, and more particularly to a combination or interchangeable blow-pipe usable for either welding or cutting of metal as desired, by simply selecting the required tip, the head and body of blow-pipe or torch being common to both forms of tips.

The object of the invention is to provide in combination with the head a plurality of interchangeable tips, each tip being so constructed and so adjusted as to receive therewithin and properly combine or commingle the gases for the desired operation in counterdistinction to combining or commingling the gases in the head and conveying them to the tip.

Another object of the invention is to provide a combination blow-pipe of the character described in which oxygen can be used in combination with all commercial combustible gases.

Another object of the invention is to provide a tip particularly adapted for use in connection with combinations of air and combustible gases, instead of oxygen and combustible gas.

A further object of the invention is to provide a novel form of valve construction which will permit the quick and easy opening and closing of the valve and which will likewise prevent disconnection or displacement of said valve.

With these various objects in view, my invention consists primarily in the employment of a head provided with gas passages and having gas supply pipes connected thereto, said head having a tip receiving chamber adapted to receive either a welding or cutting tip, the gas passages being so arranged with reference to the chamber and tip construction as to render said tips readily interchangeable one with the other, together with means for holding either of the tips in place.

The invention consists also in certain novel features of construction and combination, all of which will be fully described hereinafter and pointed out in the claims.

In the drawings forming a part of this specification, Figure 1 is a side elevation of the tip constructed in accordance with my invention; Fig. 2 is a longitudinal sectional view of the same, said section being taken on the line 2—2 of Fig. 3; Fig. 3 is a transverse sectional view taken through the valve chamber; Fig. 4 is a rear end view of the device; Fig. 5 is a detail sectional view of the cutting tip; Fig. 6 is a detail elevation of the central portion of the cutting tip; Fig. 7 is a sectional view of the welding tip; and Fig. 8 is a sectional view of the tip adapted to be used wherever a combination of air and combustible gas is employed instead of oxygen and a combustible gas.

In the practical embodiment of my invention I employ a head 10, which is constructed with a chamber 11, and passages 12 and 13 leading into said chamber, said passages 12 and 13 diverging as they lead to the chamber 11, the passage 12 entering said chamber at or near the upper end thereof, while the passage 13 enters it about midway its length. The upper portion of the chamber is preferably somewhat reduced in diameter, and this reduced portion is screw-threaded as shown at 14 for the purpose of securing the interchangeable tips, the inner end of each tip being screw-threaded to engage the threaded portion 14 of this chamber 11.

15 indicates the welding tip, and 16 the cutting tip, the inner end of the tip 15 being threaded at 17, and the inner end of the cutting tip threaded at 18 for the purpose of connecting with the head as previously described. The outer end of the head is also preferably threaded externally at 19 to receive a gasket 20 which aids in securing the tip to the head; a packing ring 21 of asbestos or similar material being interposed between the tip and outer end of the head constituting a closure for the chamber 11. Other equivalent means may be employed for securing the tip within the chamber of the head, the idea being to so position the tip that the passage 12 will communicate with the inner or upper end thereof, while the passage 13 will communicate with the central portion thereof.

The welding tip 15 is tubular in form and is constructed with a contracted or tapered outer end 22, the inner end being internally threaded to receive a screw plug 23 which has a longitudinal bore or aperture 24 passing therethrough, the plug being slightly tapered as shown. The bore or aperture 24 is for the passage of oxygen as will be more fully explained hereinafter. The body of the tip is also provided with a plurality of perforations 25 adjacent the inner threaded end, through which the combustible gas passes to the interior of the tip, there being sufficient annular space between the tip and the side walls of the chamber 11 to permit a considerable quantity of combustible gas to circulate around the tip after passing through the passage 13.

The oxygen-receiving plug 23 located at the inner end of the tube and having its tapered end located substantially opposite the inner series of perforations 25 serves as an injector for drawing in the combustible gas and commingling the oxygen therewith, this injection and mixing or commingling taking place within the tip and emerging from the contracted end thereof in a thoroughly combined state capable of producing an intensely hot flame particularly adapted for welding purposes.

The cutting tip embodies a tubular outer shell externally and internally threaded at its inner end and contracted or tapered at its outer end. Within this tubular shell is arranged a filler consisting of an inner plug portion 26, a centrally reduced stem portion 27, and a tapered outer end portion 28. A central passage 29 extends entirely through the entire filling member and in addition to this central passage 29 there is a bore 30 extending through the inner plug portion 26, and grooves 31 produced upon the exterior of the cone-shaped or tapered end 28, which, in connection with the contracted or tapered end of shell provide a series of discharge apertures concentrated around the center of the tip. The inner portion of the shell is also provided with a series of perforations 32. The oxygen passes through the passage 12 and into the top of the chamber 11, and then through the central passage 29 and also through the supplemental passage 30, and the combustible gases pass through the passage 13 and enter the annular chamber 11 from which they pass through the perforations 32 into the tip. The combustible gases commingle with the oxygen which passes through the bore or passage 30, and these commingled and mixed gases then emerge through the grooves or apertures 31 at the end of the tip and constitute the proper mixture for the preheating flame, the oxygen itself being delivered through the central passage 29 serving to cut the metal after the preheating operation has been accomplished. The central passage 29, supplemental passage or bore 30, grooves or apertures 31 and perforations 32 are all proportioned with relation to the size of the tip and to each other in order to produce the proper preheating mixture and at the same time permit the proper delivery of the cutting jet of oxygen.

In Fig. 8 I have shown another form of tip which is adapted for use in connection with a combustible gas and air instead of a combustible gas and oxygen, this tip consisting of a tube 33 externally and internally threaded at its inner end and having a central bored plug 34 inserted in said end, there being a plurality of perforations 35 produced in the tube adjacent to the end of the plug 34, and at the extreme outer end of the tube I provide a flaring or bell-shaped flange 36 the inner face of which is rounded or curved preferably upon the opposite circle. This flaring or bell-shaped flange at the outer end of the tip prevents the flame dying out or being interfered with by induced currents of air which would otherwise tend to flow in or be drawn in close to the end of the tip.

The head 10 has pipes 37 and 38 connected thereto by brazing or otherwise, the pipe 37 communicating with the passage 12 while the pipe 38 communicates with the passage 13. These pipes are surrounded by a sleeve 39 which screws into a coupling 40 which in turn is threaded to the rear end of the head 10 as most clearly shown. The pipes 37 and 38 and sleeve 39 pass through and into spacing members 41 and a casting 42, respectively, and to this spacing member and casting is attached a surrounding sleeve of fiber or similar material 43, which provides a suitable handle for the device.

The casting 42 is a part of the valve casing to which are connected the nipples 44 and 45 respectively, for connecting the oxygen and combustible gas supply pipes, the nipple 44 communicating with a passage 46 while the nipple 45 communicates with a passage 47, these passages discharging into valve chambers 48 and 49 respectively, and in which operate the valves 50 and 51, the valve proper being adapted to seat upon a conical-shaped seat 52. The valves 50 and 51 are exactly alike in construction and comprise an outer threaded portion 53 which screws in the threaded portion of the casing, the stem 54 projecting through a gasket 55 secured to the valve casing, the outer end of the stem having the hand wheel 56 of fiber or other material connected thereto. The inner end of the valve is constructed with a reduced sleeve-like portion 57 in which is placed the facing 58 in the form of a solid block, preferably made of fiber, compressed milk or soft metal alloy whereby a perfect closure can be obtained; and by constructing the valve with a reduced stem and employing a gasket, one is not likely to disconnect the valve from the casing as only a limited amount of movement can be obtained, this movement being ample to completely open the valve for the purpose of permitting the passage of gas.

In operation, the proper tip will be selected according to the work to be done. This tip is then inserted in the head and screwed into the chamber, the packing ring and gasket being positioned and secured in place. The valves can then be opened and regulated according to the mixture desired and the operation either of welding or cutting can be proceeded with. Should it be desired to discontinue one operation and take up the other, it is only necessary to remove the gasket, unscrew and remove the tip, and substitute the other tip for the desired operation, screwing the same firmly in place and positioning the same by means of the gasket at the lower end of the head, and the torch is ready.

For welding purposes the valves will be adjusted to provide the proper gas mixture for the welding flame, and for cutting purposes it will only be necessary to make the proper adjustment of the valves in the first instance for the reason that the central bore 29 and the supplemental bore 30 are so proportioned with reference to each other that the proper preheating mixture will be made within the tip and at the same time there will be discharged at the center of the end the proper proportion of oxygen gas to accomplish the cutting operation.

In addition to providing a blow-pipe torch with interchangeable tips, it will also be seen that the tip, when inpaired can be removed and replaced by a new one, the tip itself constituting an inexpensive portion of the device as a whole.

Having thus described my invention, what I claim is:—

1. In a torch of the kind described, the combination with a head having passages communicating with cutting and combustible gas connections, of a tubular tip having a contracted outer end, the inner end of said tip being threaded internally and externally, said inner end being secured within the head between the passages in said head, a bored plug arranged in the inner end of said tip, and a plurality of openings in said tip below said plug, said openings having communication with an annular space formed within the head and communicating with one of the passages in said head.

2. In a torch of the kind described, the combination with a head having passages communicating with cutting and combustible gas connections, of a tubular tip having a contracted outer end, the inner end of said tip being threaded internally and externally, said inner end being secured to the head between the passages therein, a bored plug secured in the inner end of said tip and extending into the tubular portion thereof, and a plurality of openings in said tip below said plug, said openings having communication with an annular space formed within the head and communicating with one of the passages in said head.

3. In a torch of the kind described, a tubular tip contracted at its outer end, its inner end being threaded internally and externally, the side walls of said tip being apertured adjacent its inner end, and a bored plug threaded into the inner end of said tubular tip as set forth.

4. In a torch of the kind described, a tubular tip contracted at its outer end, the inner end thereof being threaded internally and externally, the side walls of said tubular tip being apertured adjacent the inner end, and a plug secured in the inner end of said tubular tip, said plug extending into the tubular portion of said tip, bored centrally, and reduced externally intermediate its ends, the outer end of said plug being tapered and grooved.

In testimony whereof, I hereunto affix my signature.

JOHN HARRIS.